Dec. 11, 1962  J. J. FUCHS  3,068,275
PROCESS FOR THE OXIDATION OF CARBOXYLIC ESTERS
Filed Jan. 18, 1960
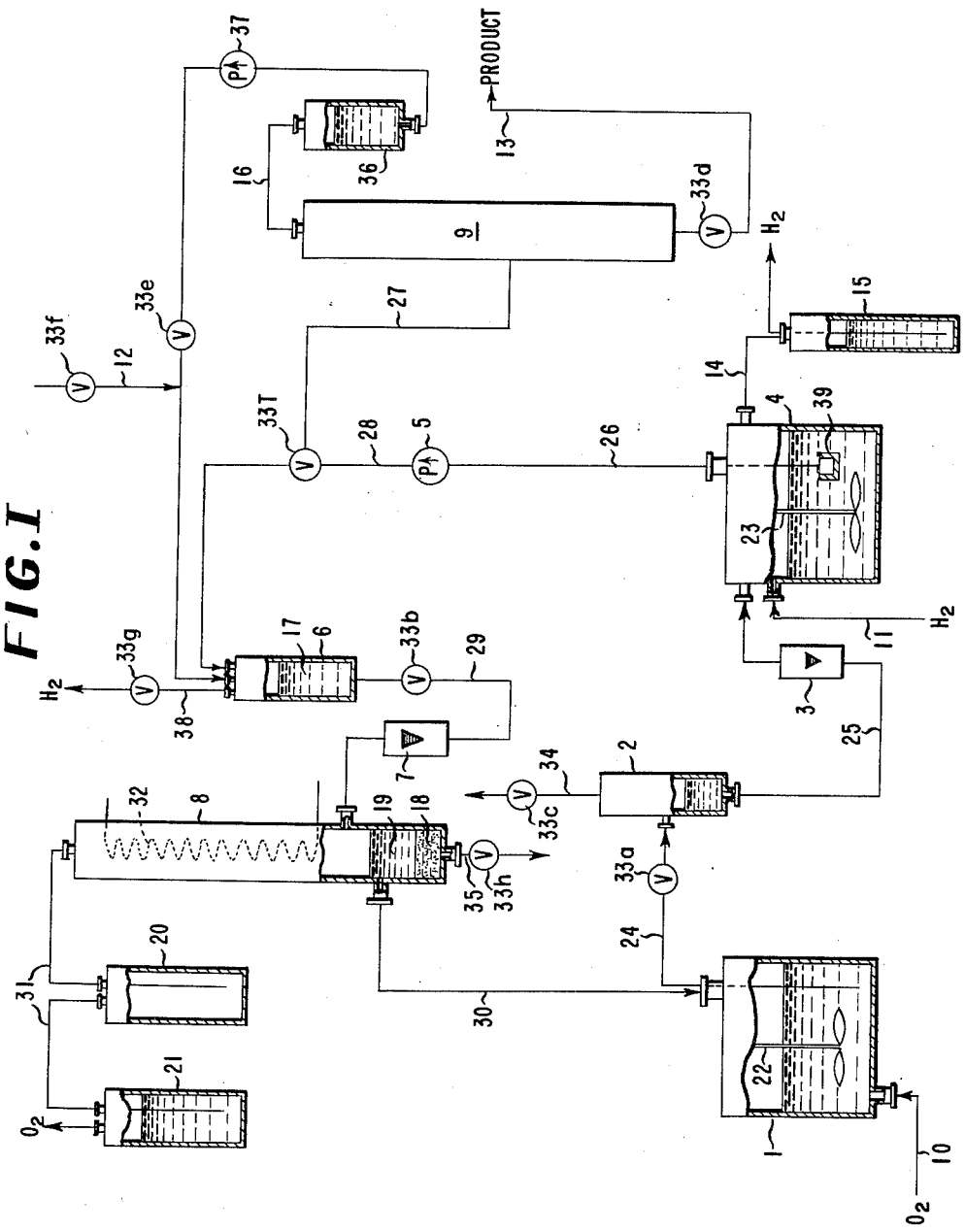
FIG.I
INVENTOR
JULIUS JACOB FUCHS
BY
ATTORNEY

United States Patent Office 3,068,275
Patented Dec. 11, 1962

3,068,275
PROCESS FOR THE OXIDATION OF CARBOXYLIC ESTERS
Julius Jacob Fuchs, Charleston, W. Va., assignor to E. I. du Pont de Nemours and Company, Wilmington, Del., a corporation of Delaware
Filed Jan. 18, 1960, Ser. No. 3,141
10 Claims. (Cl. 260—468)

This invention is concerned with a process for the oxidation, with a gas containing molecular oxygen, of carboxylic esters having a tertiary hydrogen atom attached to the alpha carbon atom to give 1-hydroperoxycarboxylic esters and 1-hydroxycarboxylic esters. More specifically, this invention is concerned with a process for the liquid phase, non-catalytic air-oxidation of carboxylic esters having a tertiary hydrogen atom attached to the alpha carbon atom and the subsequent reduction of the oxidized product to 1-hydroxycarboxylic esters.

The liquid phase air- or oxygen oxidation of carboxylic esters having a tertiary hydrogen atom attached to the alpha carbon atom has not been reported previously. Such a process, if controlled to give specific oxidation of the alpha tertiary hydrogen atoms, will yield hydroperoxy esters which are valuable as intermediates in the preparation of a variety of organic solvents and monomers for polymerization to thermoplastic resins. Furthermore, such products are useful as polymerization catalysts in free radical polymerization systems.

New routes to monomers for the preparation of synthetic plastics are of value in offering alternative and potentially cheaper routes to valuable industrial plastics. The products of this invention are of great value for the synthesis of such diverse materials as methylmethacrylate for incorporation into acrylic resins and cyclohexanone for use as a solvent or as an intermediate for conversion to adipic acid.

The first object of the present invention is to provide a process for the oxidation of esters of aliphatic and saturated alicyclic (sometimes referred to as cycloaliphatic or naphthenic) carboxylic acids having a tertiary hydrogen atom attached to the alpha carbon atom. A further objective of this invention is to provide such an oxidation process which will yield as the primary product the hydroperoxide corresponding to the oxidation of the tertiary hydrogen atom attached to the alpha carbon atom of an ester of the aforesaid class. Still another object of this invention is to provide a process for the preparation of 1-hydroperoxycarboxylic esters and 1-hydroxycarboxylic esters by the oxidation of carboxylic esters having a tertiary hydrogen atom attached to the alpha carbon atom of the acid radical. A still further object is to provide a continuous, cyclic, alternate oxidation and hydrogenation process for the conversion of said carboxylic esters to 1-hydroxycarboxylic esters.

It has now been discovered that the objects and advantages of this invention can be achieved by providing a process for the oxidation of esters of carboxylic acids having a tertiary hydrogen atom attached to the alpha carbon atom of the acid radical which comprises subjecting an ester of a carboxylic acid having a tertiary hydrogen atom attached to the alpha carbon atom to non-catalytic, liquid phase oxidation with a gas containing molecular oxygen at a temperature between 70° and 200° C. under a pressure between atmospheric and about 500 atmospheres for a time sufficient to permit the formation of from 0.1% to 6% by weight of the 1-hydroperoxycarboxylic ester in the reaction mixture.

FIGURE I is a schematic flowsheet of the continuous oxidation-hydrogenation process of this invention as described in detail in Example 4.

The carboxylic esters with which this invention is concerned are esters of aliphatic and naphthenic carboxylic acids which can be represented by the formulae

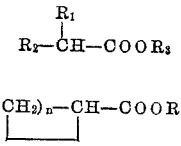

and $$(CH_2)_n-CH-COOR_3$$

respectively. In these formulae, $R_1$, $R_2$ and $R_3$ represent hydrocarbon radicals such as methyl, ethyl, propyl, butyl, isobutyl, amyl, hexyl, cyclohexyl, etc., and $n$ is an integer from 3 to 5 inclusive. The critical structural feature in these compounds is the tertiary hydrogen atom on the carbon atom alpha to the carboxylic ester group. Particularly valuable and useful members of the aliphatic carboxylic ester class are the alkyl isobutyrates, including methyl, ethyl, and n-butyl isobutyrates, since these materials can be oxidized to the corresponding 1-hydroperoxyisobutyrates which in turn can be reduced to 1-hydroxyisobutyrates and the latter dehydrated to give alkyl methacrylates of great value for polymerization to give acrylic resins. Particularly valuable and useful examples of the naphthenic carboxylic esters are the alkyl hexahydrobenzoates (sometimes termed cyclohexanecarboxylates) since these materials can be oxidized by the process of this invention to 1-hydroperoxycyclohexylcarboxylates which in turn can be converted as described in copending applications, either by hydrogenation and oxidation to adipic acid, or, alternatively, by treatment with aqueous alkali, the 1-hydroperoxycyclohexyl carboxylates can be converted to cyclohexanone, a valuable solvent and an intermediate for nitric acid oxidation to adipic acid. Adipic acid is a particularly valuable monomer for the synthesis of various nylons such as 66-nylon, the product obtained by the condensation polymerization of adipic acid with hexamethylenediamine.

For the successful operation of the process of this invention, it is preferable that it be carried out in the absence of metals or other oxidation catalysts since such materials also catalyze the decomposition of the hydroperoxide product to give a variety of decomposition products in admixture. Ceramic or glass-lined autoclaves are suitable for the operation of the process at elevated pressures. All glass equipment may be employed if desired for operation of the process at atmospheric pressure.

It has been found that the liquid phase oxidation process of this invention can be carried out over a temperature range of from 70° to 200° C., but preferably, the temperature of the reaction should be between 100° and 170° C. At temperatures below 100° C., the oxidation proceeds very slowly so that in general, it is not as economical to carry it out in the temperature range of 70 to 100° C. Above 170° C., the rate of reaction is very rapid, but there is more tendency for the undesirable thermal decomposition of the hydroperoxide product to occur. The process is operable at atmospheric pressure when high boiling carboxylic esters are employed. When lower-boiling materials, such as methyl isobutyrate, are employed, elevated pressures are required to keep the carboxylic ester in the liquid phase. Any pressure sufficient to keep the carboxylic ester selected as starting material in the liquid phase at the oxidation temperature chosen is suitable. In general, the process can be carried out at pressures between atmospheric pressure and about 500 atmospheres pressure.

Either air or pure oxygen gas can be employed in the process of this invention. Where air is used, provision must be made for passing larger gas volumes into the oxidizer and for removing the large volume of inert nitrogen from the oxidizer.

Maximum peroxide concentrations in the oxidizer of between 4 and 6% can be obtained by the process of this invention. In order to reach such concentrations, the reaction time will vary from about 1½ to 2 hours at 150° C. to 50 hours at 90° C. If the reaction time is extended too far beyond the optimum time, the peroxide concentration decreases from the maximum obtainable.

While the hydroperoxides obtained by the process of this invention may be further processed as a 4–6% solution in the starting material, usually it is preferable to concentrate them by distillation under reduced pressure in glass or other non-metallic equipment. By such fractionation, the unreacted starting material is taken overhead as a distillate, and the hydroperoxide product can be concentrated to a solution containing from 30 to 50% hydroperoxide concentration; this solution can be concentrated further by distillation of the hydroperoxide at low pressures.

The 1-hydroperoxycarboxylic esters obtained as the primary products of the oxidation of the subject invention can be reduced by catalytic hydrogenation at pressures from atmospheric to 100 atmospheres to the corresponding 1-hydroxycarboxylic esters. Such materials may then be used for oxidation to other carboxylic acids or they may be subjected to dehydration to give alpha, beta- unsaturated carboxylic esters useful polymerization in acrylic resins.

Another important use for the hydroperoxides of the subject invention is for conversion into ketones. The preparation of ketones is achieved by dissolving the 1-hydroperoxycarboxylic esters in approximately 1 normal aqueous caustic solution containing NaCl, and heating to the boiling point. It has been found that these hydroperoxides under these conditions are converted smoothly in high yields to the corresponding ketone with the formation of sodium carbonate and the alcohol derived from the ester group. While the reaction is general, this reaction is particularly valuable with alkyl 1-hydroperoxyhexahydrobenzoates since the resultant ketone is cyclohexanone, particularly valuable for conversion by nitric acid oxidation to adipic acid. Adipic acid can also be obtained by another route from 1-hydroperoxy-1-carboxyalkyl cyclohexane. This route involves reduction of the hydroperoxy group to a hydroxy group and the subsequent nitric acid oxidation of the 1-hydroxy-1-carboxyalkyl cyclohexane to give adipic acid directly.

The primary oxidation process of the subject invention can be represented most broadly by the generic Equation I:

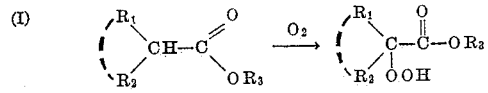

where $R_1$, $R_2$, and $R_3$ are hydrocarbon radicals, and $R_1$ and $R_2$ may be joined as part of an alicyclic ring containing from 3 to 5 $CH_2$— groups.

The conversion of the primary oxidation product, the 1-hydroperoxycarboxylate, into other useful derivative products can be represented by the following equations, II, III, IV, and V:

Equation II shows the formation of a ketone by treatment of the hydroperoxide with aqueous alkali; Equation III shows hydrogenation of the hydroperoxide to the corresponding 1-hydroxycarboxylic ester; Equation IV shows the conversion of the 1-hydroxycarboxylic ester to an alpha-beta unsaturated carboxylic ester; and Equation V shows the nitric acid oxidation of the 1-hydroxycarboxylic ester to carboxylic acids.

The following examples are illustrative of preferred methods of carrying out the process of the subject invention. They are intended to be illustrative only and not limiting on the scope of the invention:

Example 1

500 g. of methyl hexahydrobenzoate (methyl cyclohexanecarboxylate) was charged to a 1-liter glass vessel provided with gas inlet and outlet tubes, a reflux condenser, and a high speed agitator. Pure oxygen was bubbled into the reaction mixture, which was maintained at 130° C., at a rate sufficient to give an off-gas volume of 1 cubic foot per hour. Five and nine-tenths percent peroxide concentration was obtained after a total reaction time of nine hours. The hydroperoxide was concentrated by distilling off unreacted starting material at 30° C. under a pressure of 1.0 mm. Hg, using all glass equipment. The tails from this distillation contained between 30 and 50% of the methyl 1-hydroperoxy hexahydrobenzoate product (methyl hydroperoxycyclohexanecarboxylate) which was distilled at 43–45° C. at a pressure ranging from 0.5 to 1.0 mm. Hg to yield a distillate containing 64% by weight of the hydroperoxide ester.

Example 2

500 g. of n-butyl isobutyrate was charged to a 1-liter glass vessel provided with gas inlet and outlet, a reflux condenser, and a high speed agitator. The liquid n-butyl isobutyrate was heated to 140° C. and pure oxygen was bubbled in at a rate sufficient to give an off-gas volume of 1 cubic foot per hour. After four hours' reaction time, the reaction mixture contained 5.2% by weight of the n-butyl 1-hydroperoxyisobutyrate.

The resulting solution of n-butyl 1-hydroperoxyisobutyrate (5.2% by weight of the hydroperoxide compound) was hydrogenated at room temperature and atmospheric pressures, using 0.5 g. palladium catalyst. After ½ hour of operation, the hydrogen absorption had ceased, and analysis of the product showed that the hydroperoxide had been quantitatively reduced to n-butyl 1-hydroxyisobutyrate. If desired, this hydrogenation can be carried out at higher pressures of hydrogen; any other common hydrogenation catalyst can be substituted for the palladium, as would be obvious to anyone familiar with hydrogenation.

Example 3

500 g. of methyl isobutyrate was charged to a 1-liter, glass-lined steel autoclave provided with gas inlet and outlet tubes, a reflux condenser, and a high-speed agitator. Pressure in this equipment was raised to about 10 atmospheres with air and the temperature of the methyl isobutyrate was raised to 150° C. Air was then bubbled through the methyl isobutyrate and the nitrogen and unconsumed oxygen were permitted to escape through a downlet valve in the outlet tube. When the concentration cooled to room temperature and the pressure reduced 4½%, the reaction was stopped and the product solution cooled to room temperature and the pressure reduced to atmospheric. This reaction product was hydrogenated

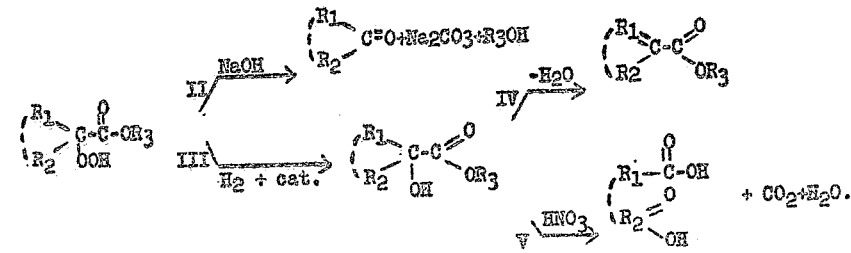

to methyl 1-hydroxyisobutyrate by the process of Example 2, and this product was isolated by vacuum distillation under 10 mm. Hg pressure.

Example 4

In this example, a continuous, cyclic process for the oxidation with pure $O_2$ of an ester of a carboxylic acid having a tertiary hydrogen atom at the alpha carbon atom, followed by the hydrogenation of the resultant hydroperoxide to give the corresponding 1-hydroxycarboxylate, was demonstrated. The apparatus was arranged to pump the effluent continuously from the oxidizer to a hydrogenation vessel, and to continuously pump the effluent from the hydrogenation vessel through a filter for the removal of palladium catalyst back to the oxidizer.

The operation of this process can be understood in more detail by reference to FIGURE I, which shows a schematic flowsheet of the process.

In FIGURE I, 1 is the oxidizer vessel equipped with a stirrer 22, an oxygen inlet tube 10, a product stream exit tube 24, and a tube 30, for recycling the carboxylic ester, containing in solution a portion of the 1-hydroxycarboxylic ester, to the oxidizer.

From the oxidizer the product stream containing hydroperoxycarboxylic ester in solution in unreacted ester passes through tube 24 to a reservoir 2 where excess, unreacted oxygen is separated and passed either to recycle or to the atmosphere through tube 34. From this reservoir the product stream passes through a tube 25 and a rotameter 3 to the hydrogenator 4 which is equipped with a stirrer 23, a hydrogen inlet tube 11, and hydrogen exit tube 14; excess hydrogen is passed out through pressure regulator 15 to recycle.

From the hydrogenator, the process stream passes into tube 26 through filter 39 to pump 5, and thence through tube 28 to a reservoir 6 where hydrogen is separated and taken off overhead through tube 38. The liquid product solution 17, containing unreacted carboxylic ester, 1-hydroxycarboxylic ester, and water produced by the hydrogenation, is passed through tube 29 and a rotameter 7 to a cooler 8 containing a cooling coil 32. In this cooler, the process stream separates into two phases, and the water 18 is bled out through tube 35, while the solution 19 of 1-hydroxycarboxylic ester in carboxylic ester is passed back to the oxidizer through tube 30.

Oxygen passing back through the tube 30 from the oxidizer is passed out overhead through the cooler 8, tube 31, cold trap 20, and pressure regulator 21, and hence to recycle or the atmosphere.

A portion of the product stream from the hydrogenator is bled out of the recirculating system through T-valve 33T and tube 27 to a fractionating column 9, operating under a partial vacuum, where the unreacted carboxylic ester is taken overhead through tube 16 and recirculated to reservoir 6 through reservoir 36 and pump 37. The 1-hydrocarboxylic ester product is taken off from the bottom of the fractionating column through tube 13. Additional carboxylic ester to replace the separated, oxidized product, is added to the system through inlet tube 12.

Throughout the system, valves are indicated by 33a—33h. Valves 33a and 33b are adjusted to keep the flow rate constant through the recirculating system and are controlled for this effect by rotameters 3 and 7.

The cyclic liquid phase oxidation-reduction is adjusted to the point where the concentration of hydroperoxide in the oxidizer is not more than 1% by weight.

In one particular example, n-butyl isobutyrate was chosen for oxidation, and the temperature in the oxidizer was maintained at approximately 150° C. with oxygen passing continuously through the liquid at a pressure only slightly above atmospheric. The effluent containing about 1% hydroperoxide by weight was continuously withdrawn from the oxidation vessel and passed to a hydrogenation vessel containing a slurried palladium catalyst in an atmosphere of hydrogen; the hydrogenation vessel was maintained at approximately room temperature and atmospheric pressure. Here, the hydroperoxy compound was continuously hydrogenated to the hydroxy compound and the n-butyl isobutyrate containing n-butyl 1-hydroxyisobutyrate was recycled to the oxidizer at such a rate that the peroxide concentration in the oxidation vessel was maintained at or below 1.0%. After seven hours of continuous operation under these conditions, about 6.6% by weight of the n-butyl isobutyrate was oxidized and converted to n-butyl 1-hydroxyisobutyrate in high yield. The n-butyl 1-hydroxyisobutyrate was isolated from the reaction mixture by vacuum distillation at 63° C. under a pressure of 10 mm. Hg. Other hydrogenation catalysts, such as platinum black, platinum oxide, Raney nickel, copper chromate, etc., can be substituted for palladium in the hydrogenation step.

A similar continuous cyclic process under 10 atmospheres pressure was carried out on methyl isobutyrate, giving similar conversion of this material to methyl 1-hydroxyisobutyrate.

Example 5

5.4 parts by weight of 1-hydroperoxy-1-carbomethoxy-cyclohexane

prepared as described in example 1, of 64.4% purity, was added to about 100 parts by weight of 1 N NaOH, containing 10 parts by weight NaCl. A homogeneous solution was obtained on stirring which gradually warmed to 50–60° C. This solution was then heated externally until it started to boil. After cooling, the two-phase reaction mixture was extracted with cyclohexane and analysis of the two layers showed that 100% conversion of the hydroperoxide had been obtained to give a yield of cyclohexanone of 97.5%; the yield of sodium carbonate was 99.8%.

Example 6

One part by weight of 1-hydroxy-1-carbomethoxy-cyclohexane (methyl 1-hydroxycyclohexanecarboxylate), obtained by the hydrogenation of the product of Example 1, was added gradually with stirring to 50 parts by weight of 50% aqueous $HNO_3$ containing 0.3% Cu and 0.1% V as salts at 75° C. After the oxidation reaction had essentially ceased, the solution was heated to 110° C. for 15 minutes and then analyzed for carboxylic acids. The yield of adipic acid was 89.4%, the yield of glutaric acid was 6.6%, and the yield of succinic acid was 2.9%. Similar results were achieved by the nitric acid oxidation of the free acid, 1-hydroxy-1-carboxycyclohexane.

I claim:

1. A process for the liquid-phase oxidation of an alkyl ester of a carboxylic acid having a tertiary hydrogen atom attached to the alpha carbon atom of the acid radical, said alkyl ester being selected from the group consisting of aliphatic carboxylic esters represented by the formula

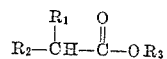

and naphthenic carboxylic esters represented by the formula

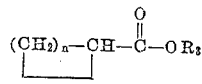

in which $R_1$, $R_2$, and $R_3$ are saturated aliphatic hydrocarbon radicals containing one to six carbon atoms and $n$ is an integer from three to five, inclusive, which comprises passing a gas containing molecular oxygen through the liquid ester maintained at a temperature between 70° and 200° C. in the absence of an oxidation catalyst and under a pressure, between atmospheric and 500 atmospheres, which is sufficient to maintain the ester in the liquid phase, and continuing the oxidation until from 0.1% to 6% by weight of the 1-hydroperoxide of the ester has been formed.

2. A continuous process for the liquid-phase oxidation of an alkyl ester of a carboxylic acid having a tertiary hydrogen atom attached to the alpha carbon atom of the acid radical, said alkyl ester being selected from the group consisting of aliphatic carboxylic esters represented by the formula

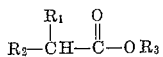

and naphthenic carboxylic esters represented by the formula

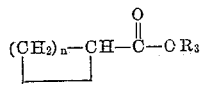

in which $R_1$, $R_2$, and $R_3$ are saturated aliphatic hydrocarbon radicals containing one to six carbon atoms and $n$ is an integer from three to five, inclusive, which comprises passing a gas comprising molecular oxygen through the liquid ester maintained at a temperature between 100° and 170° C. in the absence of an oxidation catalyst and under a pressure, between atmospheric and 500 atmospheres, sufficient to maintain the ester in the liquid phase, and continuously withdrawing the reaction mixture at a rate such that the concentration of the resulting 1-hydroperoxide ester in the oxidizer is between 0.1% and 1% by weight, and passing the effluent solution from the oxidizer to a hydrogenation vessel containing a hydrogenation catalyst and maintained at ambient temperature under a pressure of between about one and about 100 atmospheres of hydrogen, and passing a portion of the resulting solution of the 1-hydroxy ester in unoxidized ester obtained as effluent from the hydrogenation vessel back to the oxidizer while diverting another portion of the effluent from the hydrogenation vessel to a fractionating column and separating the 1-hydroxycarboxylic ester from the unoxidized portion of the original carboxylic ester by fractional distillation, and returning the unoxidized carboxylic ester to the aforesaid oxidizer together with sufficient additional carboxylic ester to replace the portion oxidized.

3. A process according to claim 1 in which the alkyl ester is an alkyl ester of isobutyric acid.

4. A process according to claim 3 in which the alkyl ester of isobutyric acid is methyl isobutyrate.

5. A process according to claim 3 in which the alkyl ester of isobutyric acid is n-butyl isobutyrate.

6. A process according to claim 1 in which the alkyl ester is methyl cyclohexanecarboxylate.

7. A process according to claim 2 in which the alkyl ester is an alkyl ester of isobutyric acid.

8. A process according to claim 7 in which the alkyl ester of isobutyric acid is methyl isobutyrate.

9. A process according to claim 7 in which the alkyl ester of isobutyric acid is n-butyl isobutyrate.

10. A process according to claim 2 in which the alkyl ester is methyl cyclohexanecarboxylate.

References Cited in the file of this patent

UNITED STATES PATENTS

| | | |
|---|---|---|
| 2,484,841 | Lorand | Oct. 18, 1949 |
| 2,920,087 | Hay | Jan. 5, 1960 |

OTHER REFERENCES

Gibson: J. Chem. Soc. (1948), pp. 2275–90.

Tobolsky et al.: Organic Peroxides (Interscience), pp. 2–12 (1954).

Hock: Angewandte Chemie, vol. 69, pp. 313–322, May 21, 1957.

Zhurnal Obshchei Khimii, vol. 28, pp. 244–6 (1958).

UNITED STATES PATENT OFFICE
CERTIFICATE OF CORRECTION

Patent No. 3,068,275 December 11, 1962

Julius Jacob Fuchs

It is hereby certified that error appears in the above numbered patent requiring correction and that the said Letters Patent should read as corrected below.

Column 4, line 72, strike out "cooled to room temperature and the pressure reduced", and insert instead -- of methyl 1-hydroperoxyisobutyrate reached about --; column 5, line 55, for "1-hydrocarboxylic" read -- 1-hydroxycarboxylic --; column 6, line 14, for "chromate" read -- chromite --; column 8, line 35, for "pp. 313-322" read -- pp. 313-321 --.

Signed and sealed this 28th day of May 1963.

(SEAL)
Attest:

ERNEST W. SWIDER
Attesting Officer

DAVID L. LADD
Commissioner of Patents